June 14, 1960 P. G. LUCAS 2,941,155
DIFFERENTIAL AMPLIFIER
Filed June 2, 1958
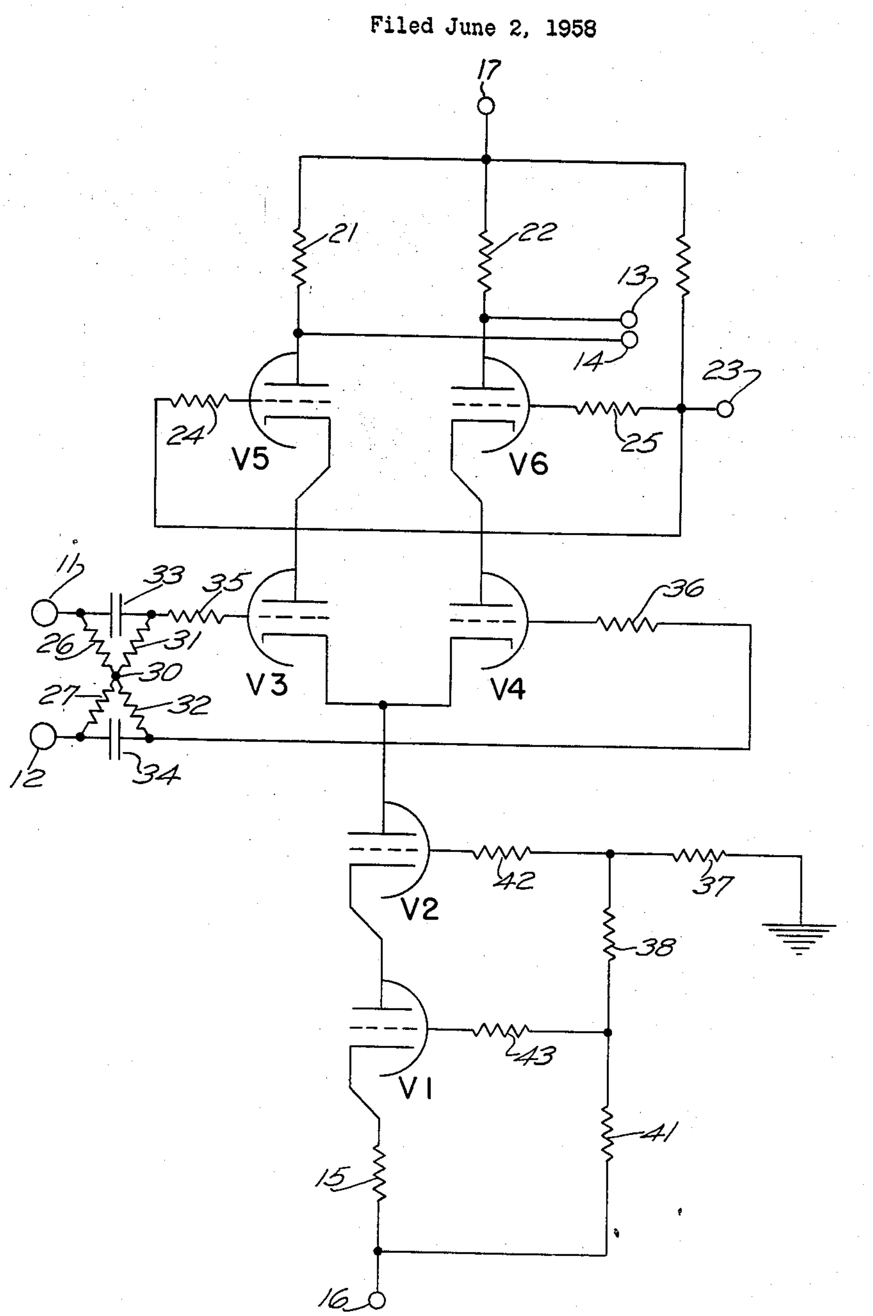
INVENTOR.
PAUL G. LUCAS
BY [signature]
ATTORNEY 2,941,155

DIFFERENTIAL AMPLIFIER

Paul G. Lucas, Rockport, Mass., assignor to Epsco, Incorporated, Boston, Mass., a corporation of Massachusetts Filed June 2, 1958, Ser. No. 739,282

5 Claims. (Cl. 330—69)

The present invention relates in general to differential amplifiers and more particularly concerns an improved differential amplifier generally of the type disclosed in the copending application of Frink Mansfield Young entitled Differential Amplifier, Serial No. 690,358, filed October 15, 1957, now Patent No. 2,896,031, and assigned to the assignee of this application.

The differential amplifier disclosed in the cited application provides an output signal accurately indicative of the amplitude difference between input signals despite wide common variations thereof. Undesired A.-C. or D.-C. common mode potentials, superimposed upon the input signals, are rejected to such an extent that exceedingly accurate indications of very slight amplitude differences are obtained. In addition, the prior system exhibits extremely low short and long term drift and substantially constant gain despite wide fluctuations in tube characteristics and other circuit parameters.

The prior differential amplifier is so effective in rejecting common mode signals that virtually the only cause of unbalance is due to the minute difference between the very small grid currents drawn by differentially connected vacuum tubes. Accordingly, the present invention contemplates and has as a primary object the elimination of unbalance due to the unequal flow of input currents in differentially-connected signal amplifying devices.

According to the invention, the input of the differential amplifier is arranged with first and second resistors connected in series between the first and second input terminals. Third and fourth resistors having the same value each have one end connected to the junction of the first and second resistors. The other ends are respectively coupled to the first and second input terminals by first and second capacitors, respectively. The first and second signal amplifying devices each have control electrodes respectively direct-coupled to the junction of the first capacitor and third resistor and the junction of the second capacitor and fourth resistor. As a result, the potential between input terminals due to the flow of control electrode current is substantially zero.

Other features, objects and advantages of the invention will become apparent from the following specification when read in connection with the accompanying drawing, the single figure of which shows a schematic circuit diagram of a preferred form of the invention.

With reference to the drawing, the difference in potential between input terminals 11 and 12 is amplified and sensed between output terminals 13 and 14. Tubes V1 and V2 and cathode resistance 15 form the common cathode impedance for differentially connected tubes V3 and V4. Resistor 15 is connected between the cathode of tube V1 and a source of negative potential on terminal 16.

Tubes V5 and V6 are connected in series with the plates of tubes V3 and V4, respectively, to maintain the plate potential of the latter tubes virtually insensitive to the common mode of input signals applied to terminals 11 and 12. The plates of tubes V5 and V6 are coupled to a source of positive potential on terminal 17 by equal resistances 21 and 22, respectively. The D.C. plate potential on tubes V3 and V4 essentially follows the potential on terminal 23 in the absence of a differential mode in the input signals. Terminal 23 is coupled to the grids of tubes V5 and V6 by resistors 24 and 25, respectively.

The network between terminals 11 and 12 prevents a potential difference from being developed therebetween due to a difference in grid currents drawn by tubes V3 and V4. Resistors 26 and 27 of the same value are connected in series between terminals 11 and 12. Resistors 31 and 32 of the same value each have one end connected to the junction of resistors 26 and 27. The other ends of resistors 31 and 32 are respectively coupled to terminals 11 and 12 by capacitors 33 and 34, respectively. The junction of resistor 31 and capacitor 33 is direct coupled to the grid of tube V3 by resistor 35. The junction of resistor 32 and capacitor 34 is coupled to the grid of tube V4 by resistor 36.

Resistors 37, 38 and 41 are connected in series between ground and negative terminal 16 to form a biasing network. The grid of tube V2 is coupled to the junction of resistors 37 and 38 by resistor 42. The grid of tube V1 is connected to the junction of resistors 38 and 41 by resistor 43. The tubes V1 and V2 and associated circuitry maintain the sum of the currents drawn by tubes V3 and V4 substantially constant. Thus, the change in current through and voltage across tubes V3 and V4 due to common mode signals is virtually zero.

The network between terminals 11 and 12 prevents the difference in grid currents drawn by tubes V3 and V4 from causing a potential difference to appear therebetween in a manner which will now be described. Regardless of the grid currents drawn by tubes V3 and V4, the junction 30 will assume some potential, arbitrarily designated E. To determine the influence of this potential E in causing a difference in potential between terminals 11 and 12, it is convenient to assume that the potential on these terminals is zero when E is zero, E then corresponding to balanced grid currents. If E becomes nonzero, then equal currents flow through resistors 26 and 27 since these resistors are equal. The voltages developed across these resistors are then equal but of opposite sense measured between terminals 11 and 12 and, hence, cause no potential difference therebetween.

Capacitors 33 and 34 provide a low impedance path for coupling A.-C. signals applied on input terminals 11 and 12 to the grids of tubes V3 and V4, respectively. If input terminals 11 and 12 are energized from a signal source through means including a chopper, the amplifier may also be used for sensing differences between D.-C. levels.

It is evident that numerous modifications of and departures from the specific embodiment described herein may be practiced by those skilled in the art without departing from the inventive concepts. Consequently, the invention is to be construed as limited only by the spirit and scope of the appended claims.

What is claimed is:

1. A differential amplifier comprising, first and second input terminals, first and second substantially equal resistors connected in series between said input terminals, third and fourth substantially equal resistors each having one end connected to the junction of said first and second resistors, first and second capacitors connected from said first and second input terminals respectively to the other ends of said third and fourth resistors respectively, and means for differentially combining signals at said other ends of said third and fourth resistors, said last mentioned means drawing currents through said resistors to develop potentials at each of said input terminals with respect to said junction of equal magnitude and opposite sense, whereby the potential difference between said input terminals due to said currents is substantially zero.

2. A differential amplifier in accordance with claim 1 wherein said differential combining means comprises, first and second signal amplifying devices each having a control electrode and drawing current through a common load impedance, and means for connecting the junction of said first capacitor and third resistor and the junction of said second capacitor and fourth resistor respectively to said control electrodes of said first and second signal amplifying devices.

3. A differential amplifier in accordance with claim 2 wherein said signal amplifying devices are first and second electron tubes, said common load impedance includes a common cathode resistance, and said control electrodes are control grids.

4. A differential amplifier in accordance with claim 3 wherein said common cathode impedance includes third and fourth electron tubes connected in series for maintaining the sum of the current through said first and second tubes substantially constant.

5. A differential amplifier in accordance with claim 4 and further comprising fifth and sixth electron tubes respectively in series with said first and second tubes for maintaining the potential across said first and second tubes independent of common mode variations.

References Cited in the file of this patent

UNITED STATES PATENTS 2,780,682 Klein ---------------- Feb. 5, 1957